United States Patent [19]

Runge

[11] 4,117,995
[45] Oct. 3, 1978

[54] AIRCRAFT WING LIFT AUGMENTATION DEVICE

[76] Inventor: Thomas M. Runge, 2501 Galewood Pl., Austin, Tex. 78703

[21] Appl. No.: 772,669

[22] Filed: Feb. 28, 1977

[51] Int. Cl.² .............................................. B64C 21/04
[52] U.S. Cl. ................................... 244/207; 244/199; 244/130
[58] Field of Search ................. 244/12.3, 12.5, 23 D, 244/40 R, 41, 42 R, 42 C, 42 CC, 130, 113, 198, 204, 207, 199, 201, 200, 214, 210; 114/185

[56] References Cited

U.S. PATENT DOCUMENTS

| 2,075,817 | 4/1937 | Loerke | 244/130 |
| 2,252,657 | 8/1941 | Zap | 244/42 CC |
| 2,841,344 | 7/1958 | Stroukoff | 244/130 |
| 2,951,662 | 9/1960 | Theodorsen | 244/42 CC |
| 2,973,922 | 3/1961 | Davidson et al. | 244/42 CC |
| 3,018,983 | 1/1962 | Davidson | 244/42 CC |
| 3,911,848 | 10/1975 | Brazier | 114/185 |

FOREIGN PATENT DOCUMENTS

| 407,609 | 10/1922 | Fed. Rep. of Germany | 244/42 CC |
| 1,103,426 | 11/1955 | France | 244/42 CC |
| 278,400 | 10/1930 | Italy | 244/42 R |
| 714,849 | 9/1954 | United Kingdom | 244/130 |

OTHER PUBLICATIONS

Anxionnaz et al., U.S. Published Ser. No. 367,666, May 25, 1943.

Primary Examiner—Galen L. Barefoot
Attorney, Agent, or Firm—B. P. Fishburne, Jr.

[57] ABSTRACT

A wing duct near and parallel to the leading edge of an aircraft wing receives air from the jet engines of the craft. The wing duct is spiral-like in cross section with an exit slit for directing high velociy air rearwardly over the dorsal wing surface and toward the trailing edge of the wing. A vertically movable slat matching the contour of the wing adjacent to the duct covers the exit slit leading from the duct when in a lowered position. The slat is raised automatically by the high velocity air stream blasting out of the exit slit and the slat directs this air stream rearwardly and prevents it from flowing forwardly. The slat is attached to the top of a gridwork through which the high velocity air stream from the exit slit must flow and the gridwork, in conjunction with the elevated slat, produces laminar flow of air across the top of the wing and minimizes turbulence When the slat is retracted to lie flush against the top of the wing, the gridwork enters a wing recess or well immediately rearwardly of the duct. The slat can be retracted by a state of the art hydraulic mechanism in the wing which allows extension of the slat and gridwork responsive to the air stream coming from the exit slit.

5 Claims, 4 Drawing Figures

AIRCRAFT WING LIFT AUGMENTATION DEVICE

BACKGROUND OF THE INVENTION

The quest for a practical short take-off and landing aircraft (STOL) has led to a number of prior art proposals in recent times. Some examples of the patented prior art are shown in U.S. Pat. Nos. 2,973,922; 3,276,727; 3,432,123 and 3,525,486.

The objective of this invention is to improve on the known prior art in terms of a lift augmentation means for an aircraft wing, which is simpler in construction and more reliable and efficient than prior art devices.

More particularly, by means of the invention, high velocity heated air from the aircraft jet engines is diverted by known means into aircraft wing ducts, parallel to and near the leading edge of the wing. Each duct is of spiral formation in cross section with an outlet slit opening through the top of the wing near and rearwardly of its leading edge and directing a high velocity air stream rearwardly over the high lift wing surface and toward the trailing edge of the wing. A wing slat covers the outlet slit when the latter is inactive and lies flush against the wing and conforms to the adjacent wing contour. The slat is elevated by the action of the high velocity air stream leaving the wing slit, and the slat directs the air stream rearwardly across the dorsal surface of the wing to materially augment the lift capability of the wing. With properly chosen dimensional parameters for the invention in relation to the wing of a jet aircraft, the aircraft will be able to take off at approximately 50 miles per hour and land at a considerably lower speed.

The trailing edge portion of the elevatable slat is fixedly attached to an underlying grid through which the high velocity rearwardly moving air stream flows, and this grid in cooperation with the slat imparts laminar flow to the lift augmentation air stream. When the slat is retracted, the grid descends into a recess provided in the top of the wing and the slat assumes a flush position on the wing in covering relationship to the wing slit. Within the wing, conventional hydraulic means is provided to retract the slat and attached grid.

DETAILED DESCRIPTION

Figure 1:
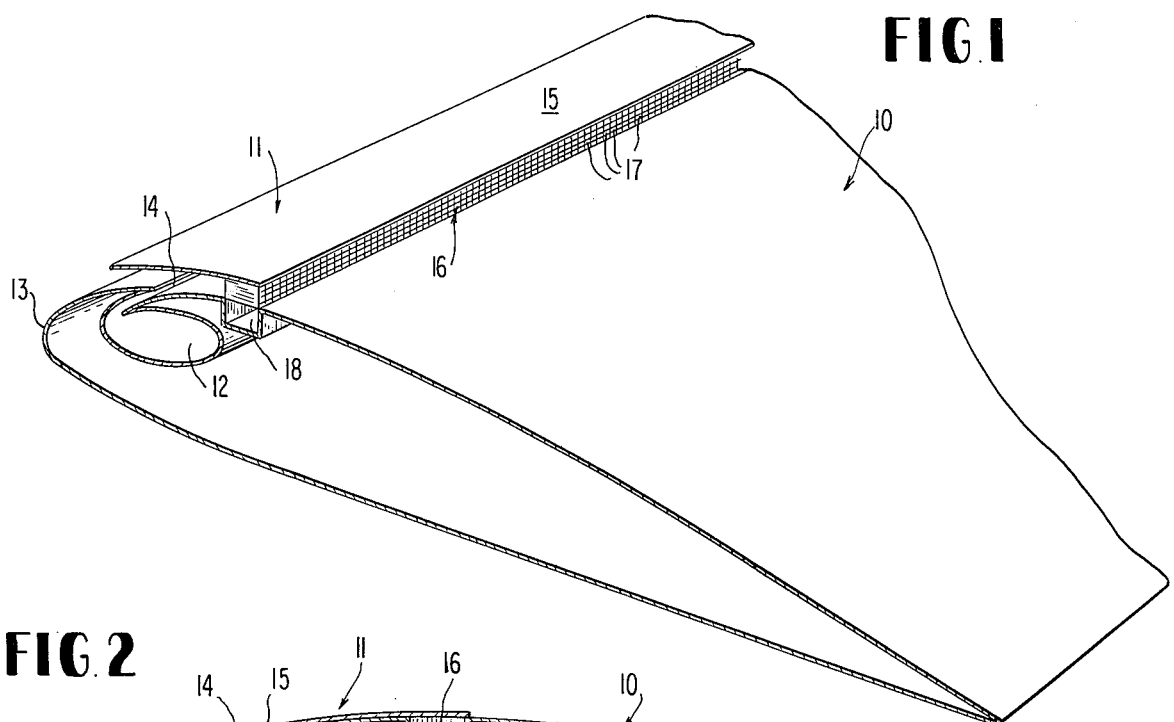
FIG. 1 is a partly schematic fragmentary perspective view of an aircraft wing having the lift augmentation means of the invention.

Referring to the drawings in detail wherein like numerals designate like parts, an aircraft wing 10 is shown somewhat schematically, and the wing lift augmentation means 11 forming the subject matter of this invention is applied to the wing, as shown in the drawings. A preferably oval duct 12, which is elongated fore and aft in cross section, is fixedly mounted within the wing 10 near and rearwardly of the leading edge 13 of the aircraft wing. Conventional structural elements, not shown, are employed to position the duct 12 relative to the wing. The duct 12 extends for substantially the entire length of the wing in parallel relation to the leading edge 13. The duct receives air diverted from the aircraft jet engines by the use of known diverter means, not shown. At its forward side, a comparatively narrow arcuate outlet slit 14 leads from the top of the duct 12 and opens through the top surface of the wing 10 somewhat rearwardly of the leading edge 13. This wing slit 14 extends for the entire length of the wing and is coextensive with the duct 12. In practice, the slit 14 may have a width of approximately 4 centimeters, although this and other dimensions will vary in accordance with the size of the wing and aircraft.

Figure 3:
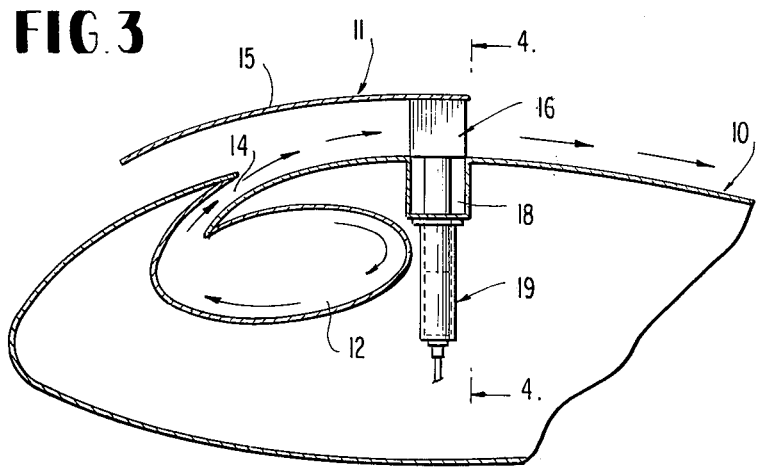
FIG. 3 is a view similar to FIG. 2 showing the lift augmentation means in the active position.

As shown by the arrows in FIG. 3, during the operation of the invention, a high velocity stream of heated air from the jet engines is emitted from the slit 14 along the entire length of the slit and flows rearwardly along the upper surface of the wing to materially increase lift in conjunction with the movement of the wing through atmospheric air. The cross sectional shape of the duct 12 and the arcuate slit 14 cause the air to flow from the duct 12 in a spiral path, as shown by the arrows, and to emerge from the slit 14 as a high velocity uniform thickness layer of air.

Figure 2:
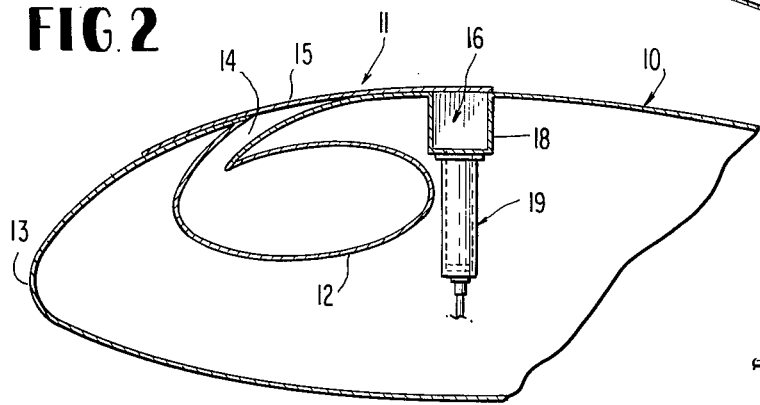
FIG. 2 is a fragmentary vertical cross section taken through the wing and lift augmentation means with the latter in the inactive position.
Figure 4:
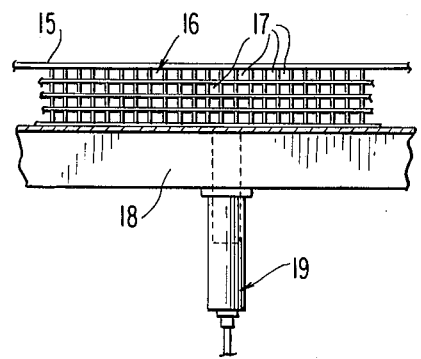
FIG. 4 is a fragmentary vertical section taken on line 4—4 of FIG. 3.

A wing slat 15, matching the profile of the wing 10 adjacent to the duct and slit 14, is adapted when in a retracted position, FIG. 2, to lie flush against the wing and cover the outlet of the slit 14. In this situation, the wing 10 functions in a conventional manner without the lift augmentation provided by the invention. The rear longitudinal edge portion of the slat 15 is fixedly attached to the top of a rigid gridwork 16 or member having a multiplicity of small fore-to-aft open and parallel rectangular channels 17 which in practice on some manned aircraft may be about 1 centimeter square. The grid member 16 may also measure approximately 5 centimeters in the fore and aft direction, and again all of these dimensions may vary with wind size and other factors.

When the slat 15 is elevated with the grid member 16, FIG. 3, the high velocity sheet-like stream of air coming from the slit 14 is caused to flow rearwardly through the rectangular channels 17 of the gridwork and this produces a laminar flow of air rearwardly across the top of the wing with minimum turbulence and accentuates the lift effect on the wing due to the high velocity air stream. The presence of the slat above the outlet of the slit 14 prevents the emitted air stream from moving upwardly or forwardly and directs it rearwardly through the gridwork 16. When fully extended, FIG. 3, the slat in practice is about four centimeters above the upper wing surface.

When the slat 15 is retracted to lie flush against the wing, FIG. 2, the gridwork 16 which is rectangular in cross section retracts into a well 18 formed in the top of the wing and coextensive with the gridwork. Under these circumstances, as clearly shown in FIG. 2, the wing 10 is conventional.

At slow take-off or landing, the air is diverted by state of the art means from the engines to the wing duct 12 and the force of the high velocity air stream leaving the slit 14 impinges on the slat 15 and automatically extends or elevates the slat and gridwork 16 to the operationally active position. At this time, the high velocity air stream flowing rearwardly across the wing serves to augment wing lift and enables the aircraft to take off at a speed of only about fifty miles per hour or less and to land at an even slower speed. When slow takeoff or landing has been accomplished by means of the invention, the slat 15 is retracted to its flush position against the wing, FIG. 2, by a state of the art hydraulic actuator means 19 within the wing and connected to the grid member 16, as indicated. The conventional means 19 may include retarder means to allow the slat 15 to rise smoothly from its retracted to its active use position under the influence of the forced air stream from the slit 14. The conventional hydraulic means 19 may consist of a cylinder within a cylinder arrangement, with the upper cylinder having perforations to allow smooth extension of the slat 15. Other known types of hydraulic or mechanical actuator means for the slat may be employed.

The device does not preclude flow of ambient air across the dorsal wing surface beneath the slat, and in fact can be expected to augment such flow. The device may be used in conjunction with leading edge slats, or may itself be lengthened in a forward direction to serve as a leading edge slat.

Slit 14 may be machined to increase in width laterally to assure proportional distribution of forced air over the wing surface, or alternately, duct 12 may be coupled to a second adjacent "windkessel" duct, the second duct receiving the jet engine air and acting as a constant pressure reservoir, passing the air to duct 12 by intermittent perforations between the two ducts.

It can be seen that the invention is characterized by structural simplicity and economy compared to other prior art proposals. It is very effective in operation, safe and entirely practical. It is applicable to jet aircraft of all types including such craft as military fighter planes, and large commercial airliners.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In an aircraft wing, an internal duct extending longitudinally of the wing near and rearwardly of the wing leading edge and having an outlet slit opening through the top of the wing for directing air from the duct rearwardly across the top of the wing, said duct adapted to receive jet engine air diverted thereto, a slat adapted in a retracted position to cover the outlet of said slit and to lie flush on the wing and having substantially the profile of the wing, said slat when extended above the wing forming a passage between the slat and wing for the rearward flow of a high velocity stream of air passing from the duct through said slit for augmenting wing lift, and support and guidance means for said slat on said wing adapted to retract the slat against the wing in covering relation to said slit and allowing extension of the slat from the wing under influence of said high velocity air stream coming from said slit, said support and guidance means including a gridwork attached to the bottom of the slat rearwardly of said slit and having multiple fore to aft grid passages for said high velocity air stream, said wing having a well formed in its top parallel to said slit and coextensive with said gridwork, whereby the gridwork can retract into the well when the slat retracts against the top of the wing.

2. In an aircraft wing as defined in claim 1, and said support and guidance means for said slat further including a linear actuator means within the wing connected with said gridwork to extend and retract the gridwork relative to the top of said wing with said slat.

3. In an aircraft wing as defined in claim 2, and said linear actuator means comprising extensible and retractable hydraulic means.

4. In an aircraft wing as defined in claim 1, and said multiple grid passages open at their fore and aft ends and being of uniform size and rectangular and arranged in right angular horizontal and vertical rows in said gridwork.

5. In an aircraft wing, an internal duct extending longitudinally of the wing near and rearwardly of the wing leading edge and having an outlet slit opening through the top of the wing for directing air from the duct rearwardly across the top of the wing, said duct adapted to receive jet engine air diverted thereto, a slat adapted in a retracted position to cover said outlet slit and to lie flush on the wing, said slat when extended above the wing forming a passage between the slat and wing for the rearward flow of a high velocity stream of air discharging through said slit for augmenting wing lift, an air laminar flow inducing means on the bottom of said slat, said wing having a top recess adapted to receive said means when said slat is retracted, and means on said wing coupled with said first-named means and slat to retract them and allowing extension of the slat and first-named means above the wing upper surface under the influence of said high velocity air stream.

* * * * *